United States Patent Office 2,716,301
Patented Aug. 30, 1955

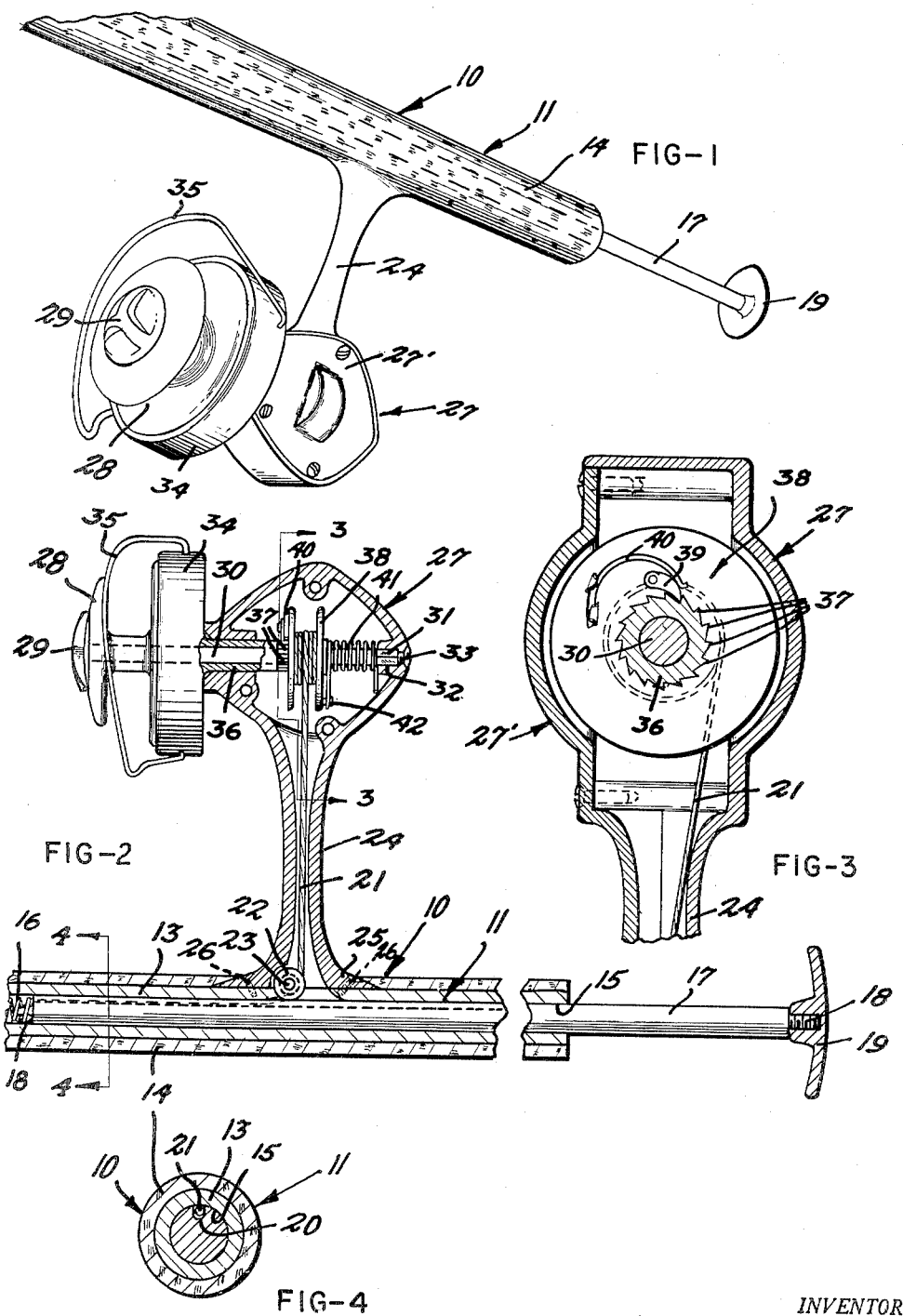

2,716,301

DRIVE FOR FISHING ROD REEL

Lawrence W. Lockwood, Spokane, Wash.

Application May 11, 1953, Serial No. 354,209

1 Claim. (Cl. 43—21)

This invention relates to fishing equipment and, more particularly, to an improved fishing rod and reel.

One object of the invention is to provide an improved fishing rod and reel combination having a unique drive means whereby the reel may be rotated.

Another object of the invention lies in the provision of an improved fishing rod and reel constructed and arranged so that one may hold the rod and wind the reel while employing but one hand.

Another object of the invention lies in the provision of an improved fishing rod and reel which has a reciprocable plunger operably connected to drive the reel for winding fishing line thereon.

Another object of the invention lies in the provision of a fishing rod having a coaxial telescopic plunger reciprocable therein and a reel having a cable spool adapted to drive the reel and a flexible cord uniting the plunger and cable spool so that longitudinal reciprocation of the plunger causes the reel to be driven for winding in fishing line.

These and other objects of the invention will become apparent during the course of the following description.

In the accompanying drawings, forming a part of this specification, and in which like numerals are employed to designate like parts:

Figure 1 is a perspective view of the handle or butt end of a fishing rod and reel embodying the instant invention;

Figure 2 is a longitudinal vertical cross section taken through the fishing rod and reel;

Figure 3 is a transverse cross section taken through the reel as at line 3—3 of Figure 2; and Figure 4 is a transverse cross section of the rod butt as at line 4—4 of Figure 2.

Referring now more particularly to the drawings, it will be seen that I have shown a fishing rod, indicated in general by the numeral 10, having a butt or handle portion 11 which comprises a tubular rod body member 13 overlaid by a sleeve of cork 14, or similar material, forming a gripping surface for the hand of a fisherman. The tubular body 13 is provided with an axial bore 15 which terminates in an end wall (not shown) spaced from the butt end of the rod. Expansion type spring 16 is positioned within the bore 15 and a plunger 17 is telescopically and reciprocably disposed within the bore 15 of the body 13 and has an end face 18 bearing against the rear end of the spring 16. The plunger 17 is provided with a reduced threaded rear end 18 upon which is secured an enlarged pressure disk 19.

Obviously, axial pressure upon the rear end of the plunger 17 will force the plunger into the rod 10 compressing spring 16 and when the pressure is released from the plunger, the spring 16 will urge the plunger outwardly to an extended position as shown in Figure 1.

Plunger 17 is provided with a longitudinally extending kerf 20 on its upper side and a flexible cord or cable 21 extends axially parallel with the plunger within the kerf 20 and is secured at its forward end to the forward end of the plunger 17. From its forward end, the cord extends rearwardly about a pulley 22 journalled on pin 23 carried by the body 13 and thence extends laterally from the body through the hollow reel support leg 24. The reel support leg 24 is provided with a splayed lower foot 25 which is secured by stub bolts 26 to the body 13. The adjacency of the pulley 22 to the plunger 17 enables the cord 21 to hold the plunger against rotation where it passes from the pulley into the kerf 20.

Laterally spaced from the rod 10 and supported by the leg 24, is a reel housing 27 which contains the drive adapted to power the reel.

Although I have shown a reel of the spinning type, it is not my intention to limit my invention to any particular design of reel, for the invention is applicable, with slight rearrangement of parts, to reels of the bait casting, trolling or other types.

In the immediate disclosure, the reel is provided with a fishing line spool 28 having the usual frictional brake adjustment knob 29 which confines the fishing line spool 28 upon the forward end of a stationary shaft 30. The rear end of the shaft 30 is provided with a square boss 31 which cooperates with a square socket 32 formed in the housing 27 to prevent rotation of the shaft 30. A stub screw 33 threads into the rear end of the shaft 30 and maintains the shaft relative to the housing 27. The reel is provided with a rotatable band 34 which carries a bail 35 and, on this type of reel, the bail rotates about the fishing line spool 28 and winds the line onto the spool. The bail 35 is provided with a tubular sleeve 36 coaxial with and encircling a portion of the shaft 30 and rotatable thereabout. The rear end of the sleeve 36 is provided with an annular group of circumferentially arranged ratchet teeth 37. Encircling the shaft 30 and rotatable thereabout immediately behind the sleeve 36, is a spool 38. The spool 38 is provided, on its forward face, with a dog 39 disposed in position to cooperate with ratchet teeth 37. To urge the dog 39 into ratcheting engagement with the teeth 37, I have provided spring 40 carried by the forward face of the spool 38. It will thus be seen that as the spool 30 rotates counter-clockwise, as viewed in Figure 3, the dog 39 will ratchet over teeth 37, and as the spool 38 is rotated clockwise, as viewed in Figure 3, the dog 39 will lock with one of the teeth 37 and cause the band 34 and bail 35 to rotate, thus reeling in the fishing line.

The cord or cable 21 has one end secured to the spool 38 and a portion of this end is wound about said spool. It will thus be seen that as the plunger 17 is moved into the rod 10, the cord 21 will be pulled about pulley 22, unwinding from spool 38 and causing the spool to rotate in a direction to drive the band 34 and wind the fishing line on the fishing line spool 28.

A torsional spring 41 encircles the rear end portion of the shaft 30 and has one end operably connected at 42 to the spool 38 and the other end 43 biased against the housing 27. As the spring 16 shifts plunger 17 outwardly of the rod when pressure is released, the cable or cord 21 is slackened and the torsional spring 41 rotates the spool 38 counterclockwise to wind the cord upon the spool as the dog 39 ratchets over teeth 37.

It will thus be seen that by placing the pressure disk 19 against one's stomach and longitudinally reciprocating rod 10, the reel may be driven to wind in the fishing line by using but one hand on the rod butt 11. It will also be noted, that the housing 27 is provided with a removable side portion 27' to facilitate maintenance of the reel.

Obviously, one may also use various motion translating mechanism between the plunger 17 and the driving means of the reel. One suggested modification being forming rack teeth on the plunger and using a pinion to translate rotary motion from the reciprocating plunger to the reel drive mechanism. I do not wish to be limited to any specific motion translating mechanism beyond the stated limitations of the appended claims.

Having thus described my invention, I claim:

A fishing implement for a one-armed person comprising a rod, a reel supported exteriorly of the rod and provided with a shaft, a plunger reciprocally mounted within the rod having at one end thereof a part adapted to engage the body of said person, means adapted to bias the inner end of said plunger in a direction toward said one end thereof, a cord secured to said reel shaft and said plunger to rotate said reel in one direction, and means to prevent rotation of said reel in a opposite direction.

References Cited in the file of this patent

UNITED STATES PATENTS

| | | |
|---|---|---|
| 335,798 | Dailey | Feb. 9, 1886 |
| 436,302 | Corbin | Sept. 9, 1890 |
| 1,010,021 | Coniff | Nov. 28, 1911 |
| 1,835,631 | Bradley | Dec. 8, 1931 |
| 2,219,500 | West | Oct. 29, 1940 |
| 2,220,017 | Maynes | Oct. 29, 1940 |
| 2,328,672 | Quear | Sept. 7, 1943 |
| 2,631,469 | Oliver et al. | Mar. 17, 1953 |